United States Patent [19]

Hoffa

[11] Patent Number: 5,705,057
[45] Date of Patent: Jan. 6, 1998

[54] FLUIDIZED BED BIOLOGICAL FILTER ASSEMBLY FOR FISH TANKS

[76] Inventor: Gary Hoffa, 7575 University Ave., La Mesa, Calif. 91941

[21] Appl. No.: 620,904

[22] Filed: Mar. 25, 1996

[51] Int. Cl.⁶ .................................................. C02F 3/06
[52] U.S. Cl. ........................ 210/150; 210/169; 119/260
[58] Field of Search ................................... 210/150, 131, 210/169; 119/260

[56] References Cited

U.S. PATENT DOCUMENTS

| | | | |
|---|---|---|---|
| 4,009,099 | 2/1977 | Jeris | 210/151 |
| 4,411,780 | 10/1983 | Suzuki et al. | 210/150 |
| 4,454,038 | 6/1984 | Shimodaira et al. | 210/150 |
| 4,482,458 | 11/1984 | Rovel et al. | 210/150 |
| 4,582,600 | 4/1986 | Atkinson et al. | 210/151 |
| 4,800,021 | 1/1989 | Desbos | 210/150 |
| 4,861,465 | 8/1989 | Augustiniak | 210/169 |
| 4,894,149 | 1/1990 | Block | 210/169 |
| 5,116,489 | 5/1992 | Englert | 119/260 |
| 5,527,455 | 6/1996 | Hoffa | 210/169 |

FOREIGN PATENT DOCUMENTS 268232  5/1989  German Dem. Rep.

*Primary Examiner*—Christopher Upton

[57] ABSTRACT

A fluidized bed biological filtration assembly for use with fish tanks and the assembly has a vertically oriented tubular housing with an elongated upper inner tubular member centrally positioned therein. A top cap covers the top end of the tubular housing and it has a contaminated water inlet port and a filtered water port. The inlet port is in communication with the top end of the inner tubular member and the outlet port is in communication with the filtering chamber formed by the interior of the tubular housing. An inverted cone shaped bottom cap is secured to the bottom end of the tubular housing and its interior has a lower inner tubular member extending upwardly and connected to the bottom of the upper inner tubular member. A plurality of radially extending horizontal slots in the bottom end of the lower inner tubular member allow contaminated water to exit therefrom and pass upwardly through filtering particulate in the bottom of the housing. The flow of the water upwardly through the particulate material produces a fluidized pattern that maximizes filtration.

5 Claims, 1 Drawing Sheet

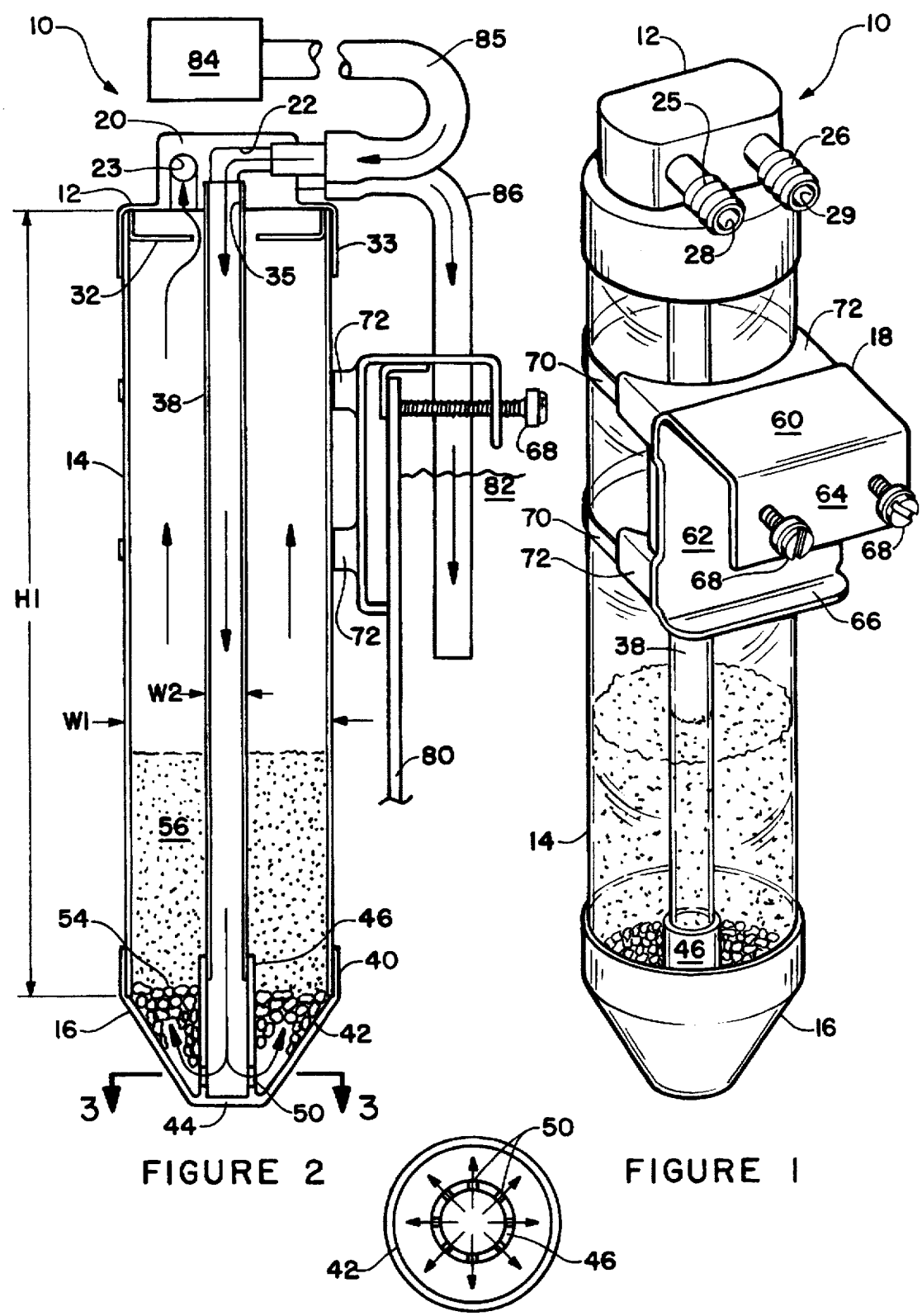

5,705,057

FLUIDIZED BED BIOLOGICAL FILTER ASSEMBLY FOR FISH TANKS

BACKGROUND OF THE INVENTION

The invention relates to a filtering system and more specifically to a fluidized bed biological filter assembly for fish tanks.

In recent years more adults and children have gotten into the hobby of having pet fish and raising pet fish. Additionally, fish tanks or aquariums are found in many restaurants and offices. One problem they all have in common is the need to dispose of the fish waste products.

Presently most aquarium's have a separate filtration tank into which the contaminated water is pumped for processing. A major drawback of the present system resides in the fact these filtration tanks are usually between 20 to 50 percent of the size of the fish tank with which it is used. Often times this filtration tank is placed in close proximity to the aquarium tank but preferably out of sight.

Another problem exists in fish tanks which use gravel in their bottom. The water that is pumped through this gravel has a tendency to channel wherever it is easiest to travel. Therefore you have bacteria colonies that are healthy in areas where the water is moving. In the areas the water is not moving, anaerobic bacteria colonies proliferate and form pockets of toxic gases. If those pockets are disturbed the toxic gas products may kill all the aquatic life in an aquarium.

Another problem with the use of gravel is that each piece of gravel has only so much potential surface area to which the bacteria can colonize. By using smaller gravel it is possible to obtain more surface area for the bacteria to colonize. Conversely that can also reduce the amount of water flow through the substrate creating areas of anaerobic bacteria activity.

It is an object of the invention to provide a novel fluidized bed biological filter assembly that eliminates the need for gravel in the bottom of the fish tank.

It is another object of the invention to provide a novel fluidized bed biological filter assembly that drastically reduces the size of the fluid chamber required for filtering the contaminated water of a fish aquarium.

It is also an object of the invention to provide a novel fluidized bed biological filter assembly that can be hung on the side wall of a fish tank on either its outer surface or its inner surface.

It is an additional object of the invention to provide a novel fluidized bed biological filter assembly that is economical to manufacture and market.

SUMMARY OF THE INVENTION

The novel fluidized bed biological filtering system is designed to be a more efficient process for converting the primary metabolic (ammonia) to the less toxic form of nitrogen (nitrate). In its preferred form, it would have an upright oriented tubular plastic housing having an open top end and an open bottom end. The top end of the tubular housing is closed by a top cap having a contaminated water inlet port and a filtered water outlet port. The bottom end of the tubular housing is closed by an inverted cone-shaped bottom cap. An elongated upper inner tubular member is vertically oriented in the tubular housing with its top end connected to the top cap and being in communication with the contaminated water inlet port. The bottom end of the upper inner tubular member is connected to and centrally positioned in a lower inner tubular member extending up from the inner surface of the bottom cap. A plurality of horizontal radial slots adjacent the bottom end of the lower inner tubular member allows contaminated water that has traveled downwardly through the upper inner tubular member to exit adjacent the inner surface of the inverted cone-shaped bottom cap. A first preselected volume of particulate material such as pea-sized gravel is placed in the filtering chamber of the tubular housing adjacent to and surrounding the bottom end of the inner tubular member. A second preselected volume of particulate material is deposited on top of said first preselected volume of particulate material. The second preferred particulate media would be glass beads having a diameter between 50 and 300 microns such as described in applicant's U.S. Pat. No. 5,453,183.

The operation of the fluidized bed biological filter assembly for fish tanks will now be described. It would normally be mounted on either the outside or inside wall surface of a fish tank. A pump in the fish tank would have a hose connecting the pump to the inlet port of the top cap. The outlet port of the top cap may have a tube connected to it in certain instances for returning the filtered water to the fish tank. Prior to the starting of the pump, the filter particulate will have sunk to the bottom of the filtering chamber formed in the tubular housing so that it covers at least most of the inner wall surface of the inverted cone-shaped bottom cap and the outer surface of the lower inner tubular member extending upwardly from its inner surface. As the pump is started, the flow of contaminated water will be forced downwardly through the upper inner tubular member and down into the lower inner tubular member. It is then directed horizontally outwardly through radial slots adjacent the bottom end of the lower inner tubular member. The turbulent force of the water will drive it upwardly through the heavier particulate members and force the filter particulate into a suspended state inside the tubular housing. The filtered water will pass upwardly and out through the exhaust port in the top cap.

DESCRIPTION OF THE DRAWING

FIG. 1 is a front perspective view of the novel fluidized bed biological filter assembly for fish tanks;

FIG. 2 is a schematic vertical cross sectional view of the novel fluidized bed biological filter assembly for fish tanks; and FIG. 3 is a schematic cross sectional view taken along lines 3—3 of FIG. 2.

DESCRIPTION OF THE PREFERRED EMBODIMENT

The novel fluidized bed biological filtering assembly for fish tanks will now be described by referring to FIGS. 1–3 of the drawing. The filter assembly is generally designated numeral 10. Filter assembly 10 has a top cap 12 a tubular housing 14, a bottom cap 16 and a support bracket assembly 18.

Top cap 12 may be made of ABS plastic and have a manifold 20 formed in its interior. Manifold 20 has a polluted water inlet passageway 22 and a filtered water outlet passageway 23. Hose adapter tips 25 and 26 are connected to the respective passageways. Hose adapter tip 25 has an inlet port 28 and hose adapter tip 26 has an exhaust port 29. An annular baffle 32 and annular flange 33 provide an annular slot for receiving the top end of tubular housing 14 which may be made of acrylic material. A recess 35 is also formed in the bottom surface of top cap 12 for fixedly receiving the top end of upper inner tubular member 38.

Inverted cone-shaped bottom cap 16 may be made of ABS plastic material and it has an annular flange 40 that telescopes over the bottom end of tubular housing 14. The annular side wall 42 tapers downwardly and inwardly and is connected to a disk-shaped bottom wall 44. Lower inner tubular member 46 is rigidly connected the top surface of bottom wall 40 and it provides structure for centering and rigidly supporting upper inner tubular member 38 whose bottom end is telescopically received therein. A plurality of radial slots 50 are formed in lower inner lower tubular member 46 adjacent its bottom end to provide outlet ports for water pumped downwardly through upper inner tubular member 38. Tubular housing 14 has a height H1 that is in the range of 6–24 inches. It has a width W1 that is in the range of 2–6 inches. Upper inner tubular member 38 has a width W2 that is in the range of ¼–2 inches.

Particles such as pea-size gravel are positioned against the inner surface of bottom wall 42 and the outer surface of lower inner tubular member 46. A preselected volume of particulate material is placed in the filtering chamber of tubular housing 14 and it settles onto the top of the pea-size gravel particles 54. Particulate material 56 has a size in the range of 50–300 microns and has a specific gravity greater than 1.5. The pea-size gravel 54 particles form a natural dam when the pump is turned off. This prevents a backwash of the very fine particulate particles 56 up into lower inner tubular member 46 and upper tubular member 38. The pea-size gravel 54 also help when the pump is restarted since it is easier for the water to travel upwardly through spaces between these larger particles.

Support bracket assembly 18 may be formed from ABS plastic material. It has a top wall 60, a rear wall 62, a front wall 64, and a bottom flange 66. Leveling screws 68 pass through threaded bores in front wall 64. Cable ties 70 travel through respective upper strap attachment sleeve 72 and lower strap attachment sleeve 73 for retaining the support bracket assembly on tubular housing 14. As seen in FIG. 2, the filtration assembly 10 can be mounted on the wall 80 of a fish tank containing water 82. Pump 84 may be mounted in the fish tank and connected by the tubular hose 85 to inlet port 28. A second tubular hose 86 would be connected to exhaust port 29 and it may extend into the water 82 of the fish tank.

What is claimed is:

1. A portable fluidized bed biological filtration assembly for use with fish tanks, said filtration assembly comprising:

a vertically oriented elongated tubular housing having a top end, a bottom end, a height H1, and a width W1; and a filtering chamber formed in said tubular housing; H1 is in the range of 6–24 inches and W1 is in the range of 2–6 inches; said tubular housing is made of plastic material;

an upright oriented elongated upper inner tubular member having a width W2 that is less than W1, said upper inner tubular member being positioned within said tubular housing; said upper inner tubular member having a top end that forms a contaminated water inlet port and a bottom end that forms a vertically oriented water outlet port;

a bottom cap having a tubular side wall that slopes downwardly and inwardly to form an inverted-cone shaped member; said bottom cap having a top end, and a bottom end having an inner surface; said top end of said bottom cap being secured to the bottom end of said tubular housing;

a top cap secured to the top end of said tubular housing; said top cap having an inlet port for receiving contaminated water and an outlet port that allows filtered water to exit and means connecting said inlet port to the top end of said inner tubular member and connecting said outlet port to the top end of said filtering chamber of said tubular housing;

means connected to the bottom end of said upper inner tubular member for taking contaminated water that is vertically exiting its bottom end and directing the contaminated water in a plurality of radial horizontal paths adjacent the inner surface of the bottom end of said bottom cap; said means connected to the bottom end of said upper inner tubular member comprising a lower inner tubular member for centering and supporting said upper inner tubular member, said lower inner tubular member has a top end and a bottom end, said top end being connected to the bottom end of said upper inner tubular member and said bottom end having plurality of radially extending slots adjacent its bottom end through which contaminated water can pass; said bottom end of said lower inner tubular member being connected to the bottom end of said bottom cap; and a preselected volume of particulate material placed in the filtering chamber of said tubular housing adjacent to and surrounding the bottom end of said upper inner tubular member, said particulate material having a size in the range of 50–300 microns.

2. A filtration assembly as recited in claim 1 further comprising means for hanging said tubular housing on the side wall of a fish tank.

3. A filtration assembly as recited in claim 2 wherein said means for hanging said tubular housing on the side wall of a fish tank is a support bracket assembly.

4. A filtration assembly as recited in claim 1 wherein said tubular housing has a cylindrical shape.

5. A filtration assembly as recited in claim 1 wherein said means connecting the inlet port of said top cap and also connecting the outlet port of said top cap to the top end of the filtering chamber of said tubular housing comprises a manifold in said top cap having a contaminated water inlet passageway and a filtered water outlet passage way.

* * * * *